US012683200B2

(12) United States Patent
Park

(10) Patent No.: US 12,683,200 B2
(45) Date of Patent: Jul. 14, 2026

(54) BATTERY PACK

(71) Applicant: SAMSUNG SDI CO., LTD., Yongin-si (KR)

(72) Inventor: Sanghun Park, Yongin-si (KR)

(73) Assignee: SAMSUNG SDI CO., LTD., Yongin-si (KR)

(*) Notice: Subject to any disclaimer, the term of this patent is extended or adjusted under 35 U.S.C. 154(b) by 863 days.

(21) Appl. No.: 18/093,068

(22) Filed: Jan. 4, 2023

(65) Prior Publication Data

US 2023/0216097 A1 Jul. 6, 2023

(30) Foreign Application Priority Data

Jan. 5, 2022 (KR) ........................ 10-2022-0001633

(51) Int. Cl.
| | |
|---|---|
| *H01M 10/42* | (2006.01) |
| *H01M 50/242* | (2021.01) |
| *H01M 50/414* | (2021.01) |
| *H01M 50/512* | (2021.01) |

(52) U.S. Cl.
CPC ..... *H01M 10/4257* (2013.01); *H01M 50/242* (2021.01); *H01M 50/414* (2021.01); *H01M 50/512* (2021.01)

(58) Field of Classification Search
None
See application file for complete search history.

(56) References Cited

U.S. PATENT DOCUMENTS

| | | | |
|---|---|---|---|
| 8,609,275 | B2 | 12/2013 | Park |
| 8,980,470 | B2 | 3/2015 | Li et al. |
| 9,136,522 | B2 | 9/2015 | Lee |
| 9,755,279 | B2 | 9/2017 | Moon |
| 2011/0236727 | A1 | 9/2011 | Jang |
| 2014/0120401 | A1 | 5/2014 | Shin et al. |

(Continued)

FOREIGN PATENT DOCUMENTS

| | | |
|---|---|---|
| CN | 102208593 A | 10/2011 |
| CN | 109742443 A | 5/2019 |

(Continued)

OTHER PUBLICATIONS

Chinese Office action dated Aug. 22, 2025.

(Continued)

*Primary Examiner* — Basia A Ridley
*Assistant Examiner* — Heng M. Chan
(74) *Attorney, Agent, or Firm* — Lee IP Law, P.C.

(57) ABSTRACT

A battery pack includes at least one battery cell; a protection circuit module electrically connected to the at least one battery cell; and a thermocompression bonding layer, the thermocompression bonding layer providing a disconnectable electrical connection between an electrode tab of the at least one battery cell and a connection tab of the protection circuit module, wherein the thermocompression bonding layer includes conductive particles and an insulating composite resin layer, the insulating composite resin layer surrounds the conductive particles, and the insulating composite resin layer includes at least one first resin layer and at least one second resin layer, the at least one first resin layer being different from the at least one second resin layer.

17 Claims, 8 Drawing Sheets

(56) References Cited

U.S. PATENT DOCUMENTS

| | | | |
|---|---|---|---|
| 2015/0044511 A1 | 2/2015 | Kim et al. | |
| 2015/0044527 A1 | 2/2015 | Neudecker et al. | |
| 2015/0263389 A1* | 9/2015 | Moon ................... | H05K 3/403 |
| | | | 429/7 |
| 2019/0072436 A1 | 3/2019 | Golubovic et al. | |
| 2019/0173134 A1 | 6/2019 | Lee et al. | |
| 2020/0335832 A1 | 10/2020 | Lee et al. | |
| 2023/0216097 A1 | 7/2023 | Park | |

FOREIGN PATENT DOCUMENTS

| | | | |
|---|---|---|---|
| CN | 111433968 A | 7/2020 | |
| CN | 111916648 A | 11/2020 | |
| CN | 219498130 U | 8/2023 | |
| JP | 2005285999 A | | 10/2005 |
| JP | 2008269883 A | * | 11/2008 |
| JP | 2010073847 A | | 4/2010 |
| KR | 10-2011-0121916 A | | 11/2011 |
| KR | 10-1156266 B1 | | 6/2012 |
| KR | 10-1379152 B1 | | 3/2014 |
| KR | 10-2015-0018412 A | | 2/2015 |
| KR | 10-2015-0107475 A | | 9/2015 |
| KR | 10-2016-0030278 A | | 3/2016 |
| KR | 10-1956932 B1 | | 3/2019 |

OTHER PUBLICATIONS

International Search Report dated Apr. 3, 2023 for corresponding PCT Patent Application No. PCT/KR2023/000242.
European Search Report dated Nov. 20, 2025.

* cited by examiner

TOP

BOTTOM

TOP

BOTTOM

BATTERY PACK

CROSS-REFERENCE TO RELATED APPLICATION

This application is based on and claims priority under 35 U.S.C. § 119 to Korean Patent Application No. 10-2022-0001633, filed on Jan. 5, 2022, in the Korean Intellectual Property Office, the disclosure of which is incorporated by reference herein in its entirety.

BACKGROUND

1. Field

Embodiments relate to a battery pack.

2. Description of the Related Art

In general, secondary batteries are rechargeable, unlike non-rechargeable primary batteries. Secondary batteries may be used as energy sources of devices, such as mobile devices, electric vehicles, hybrid vehicles, electric bicycles, or uninterruptible power supplies, and depending on the type of an external device using a secondary battery, the secondary battery may be used as a single battery cell or as a battery pack in which a plurality of battery cells are connected to each other to constitute a unit.

A small mobile device, such as a mobile phone, may operate for a certain time period with the output and capacity of a single battery, whereas, for a mobile device having a relatively large size, such as a notebook computer, an electric vehicle consuming a relatively large amount of power, or a device requiring an operation of a relatively long duration and high power, such as a hybrid vehicle, a battery in the form of a pack including a plurality of batteries may facilitate sufficient output and capacity, and an output voltage or an output current may be increased based on the number of batteries included therein.

SUMMARY

The embodiments may be realized by providing a battery pack including at least one battery cell; a protection circuit module electrically connected to the at least one battery cell; and a thermocompression bonding layer, the thermocompression bonding layer providing a disconnectable electrical connection between an electrode tab of the at least one battery cell and a connection tab of the protection circuit module, wherein the thermocompression bonding layer includes conductive particles and an insulating composite resin layer, the insulating composite resin layer surrounds the conductive particles, and the insulating composite resin layer includes at least one first resin layer and at least one second resin layer, the at least one first resin layer being different from the at least one second resin layer.

The at least one first resin layer may include a thermoplastic resin material that undergoes a volume expansion at a temperature greater than or equal to a predetermined transition temperature, and the at least one second resin layer may include a thermosetting resin material that maintains shape stability at a temperature greater than or equal to the predetermined transition temperature.

The predetermined transition temperature may be a predetermined threshold temperature for detecting an abnormal situation of the at least one battery cell.

The at least one first resin layer and the at least one second resin layer may be stacked with respect to each other between the electrode tab of the at least one battery cell and the connection tab of the protection circuit module.

The at least one first resin layer and the at least one second resin layer may be different layers separated from each other with an interface therebetween.

The insulating composite resin layer may be between the electrode tab of the at least one battery cell and the connection tab of the protection circuit module in a two-layer structure including the at least one first resin layer and the at least one second resin layer stacked with respect to each other.

A thickness of the at least one first resin layer may be about equal to a thickness of the at least one second resin layer.

The at least one first resin layer may include two separate first resin layers, and the insulating composite resin layer may be between the electrode tab of the at least one battery cell and the connection tab of the protection circuit module in a three-layer structure in which the at least one second resin layer is between the separate first resin layers.

The two separate first resin layers may be adjacent to a position at which the electrode tab and the conductive particles contact each other, and a position at which the connection tab and the conductive particles contact each other.

The two separate first resin layers may include an upper first resin layer and a lower first resin layer, the at least one second resin layer may be between the upper first resin layer and the lower first resin layer, a thickness of the upper first resin layer may be about the same as a thickness of the at least one second resin layer, and the thickness of the upper first resin layer may be about the same as a thickness of the lower first resin layer.

The at least one second resin layer may include two separate second resin layers, and the insulating composite resin layer may be between the electrode tab of the at least one battery cell and the connection tab of the protection circuit module in a three-layer structure in which the at least one first resin layer is between the separate second resin layers.

The two separate second resin layers may include an upper second resin layer and a lower second resin layer, the at least one first resin layer may be between the upper second resin layer and the lower second resin layer, a thickness of the upper second resin layer may be about the same as a thickness of the at least one first resin layer, and the thickness of the upper second resin layer may be about the same as a thickness of the lower second resin layer.

The thermocompression bonding layer may provide a high-current path for a charging/discharging current of the at least one battery cell.

The at least one battery cell may include a plurality of different battery cells that are electrically connected with the protection circuit module.

The plurality of different battery cells may be adjacent to each other such that electrode tabs connected to the protection circuit module extend in parallel with each other.

The protection circuit module may include an avoidance hole at a position between the plurality of different battery cells adjacent to each other, the avoidance hole accommodating sealing parts of the different battery cells.

The at least one battery cell may include a first electrode tab and a second electrode tab having different polarities, the protection circuit module may include a first connection tab connected to the first electrode tab and a second connection tab connected to the second electrode tab, respectively, and the thermocompression bonding layer may be between the first electrode tab and the first connection tab and between the second electrode tab and the second connection tab.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
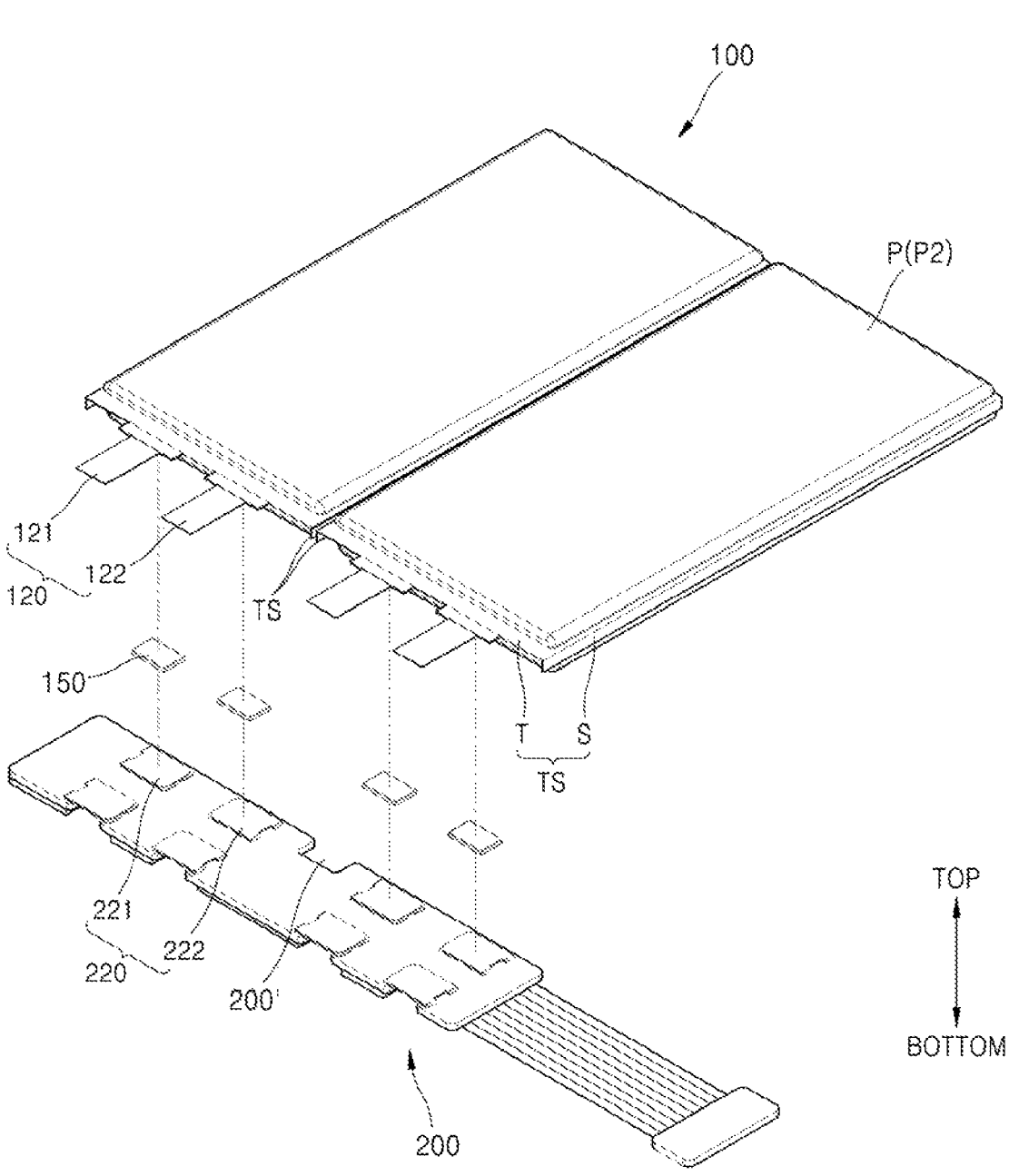
FIG. 1 is an exploded perspective view of a battery pack according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, the terms "or" and "and/or" are not exclusive terms, and include any and all combinations of one or more of the associated listed items. Expressions such as "at least one of," when preceding a list of elements, modify the entire list of elements and do not modify the individual elements of the list.

Hereinafter, a battery pack according to an embodiment will be described with reference to the accompanying drawings.

Figure 2:
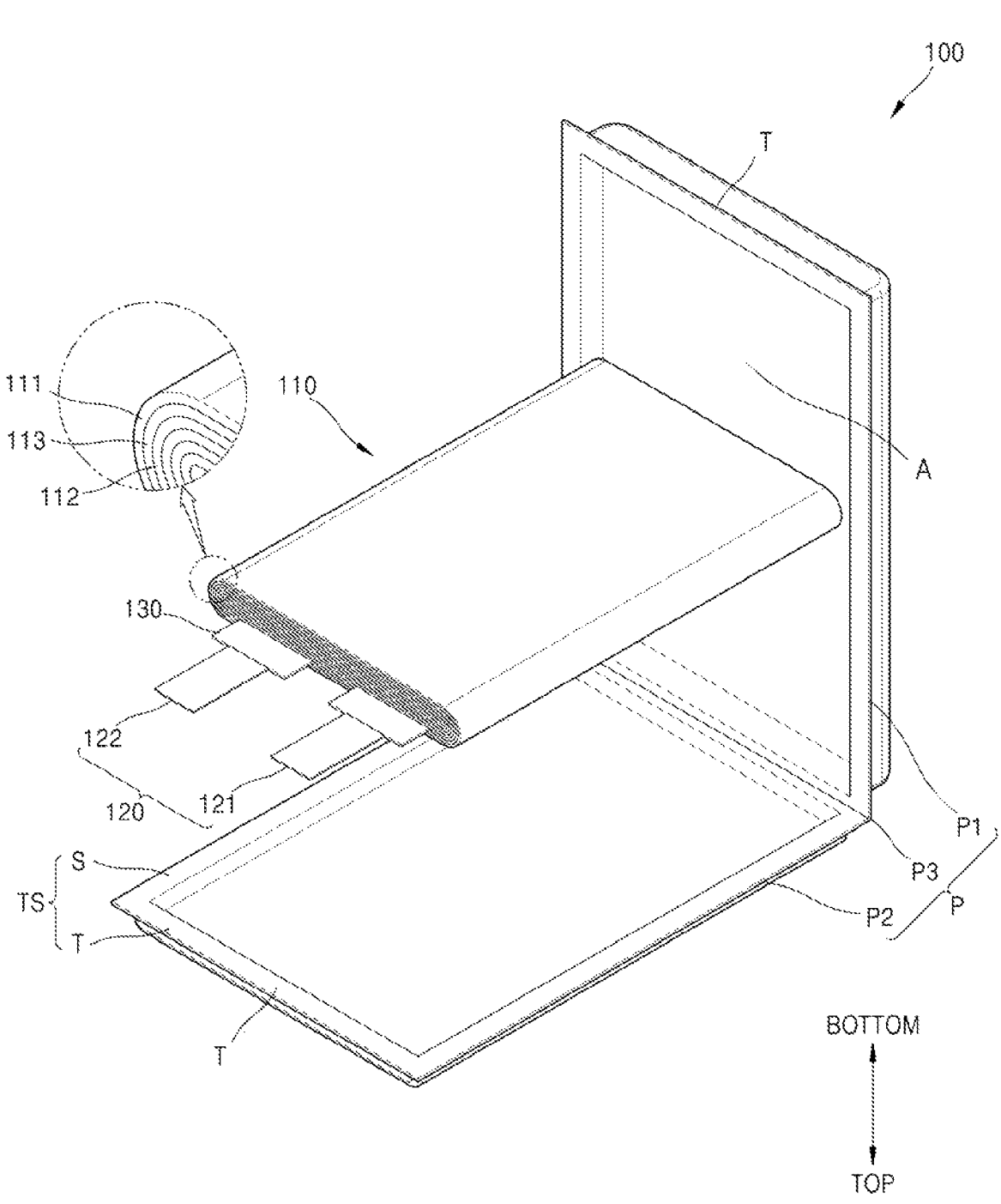
FIG. 2 is an exploded perspective view of a battery cell illustrated in FIG. 1.
Figure 3A:
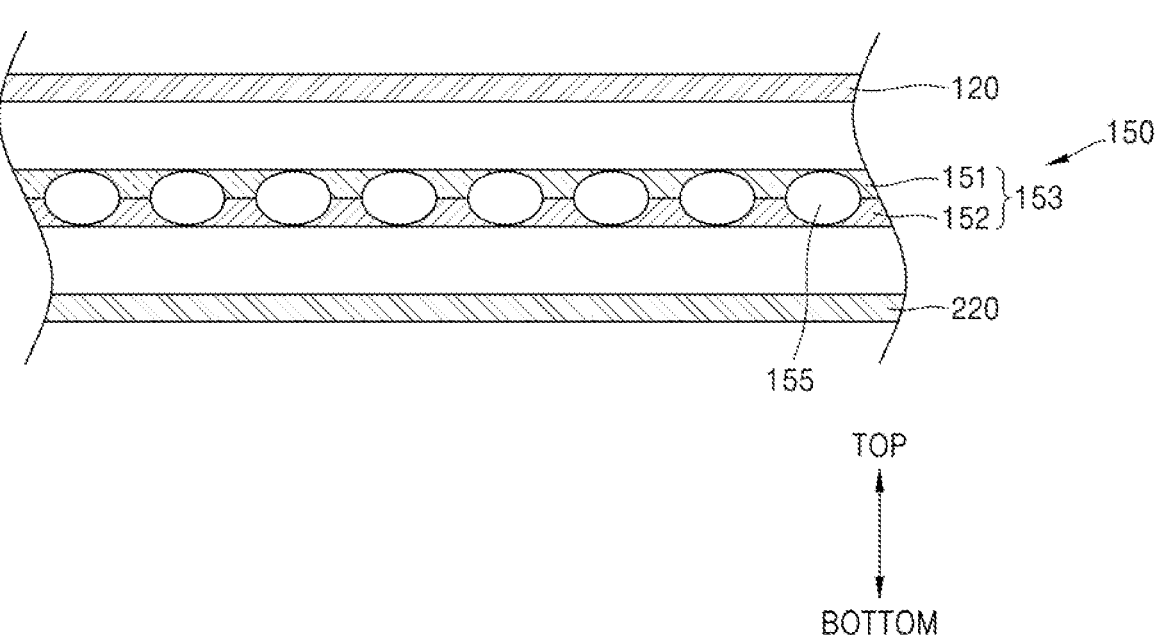
FIG. 3A is a cross-sectional view of a stage in a high-temperature compression of a thermocompression bonding layer according to an embodiment.
Figure 3B:
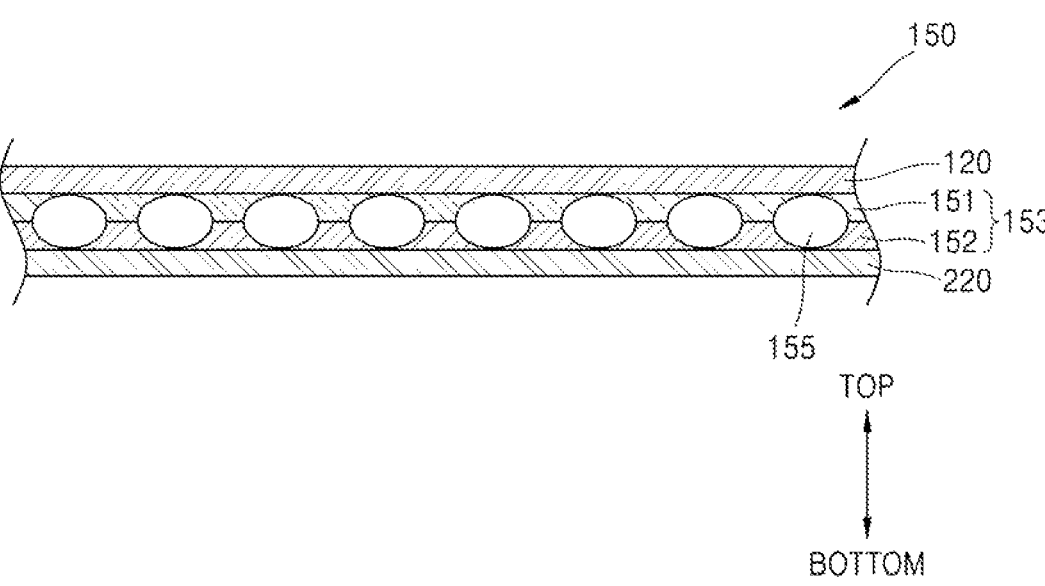
FIG. 3B is a cross-sectional view illustrating a conductive connection of a thermocompression bonding layer formed through the high-temperature compression illustrated in FIG. 3A.
Figure 3C:
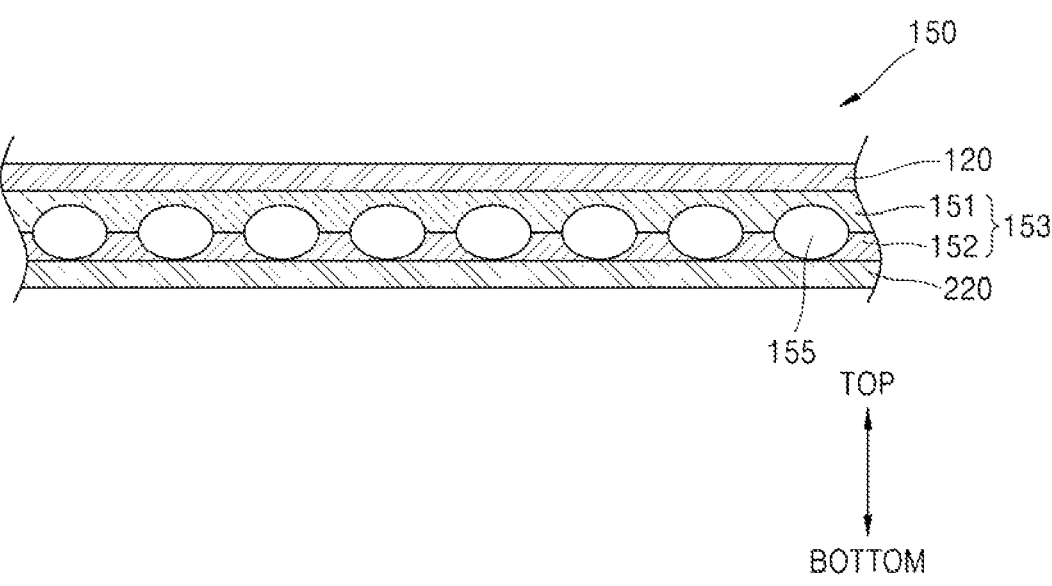
FIG. 3C is a cross-sectional view illustrating a stage in a transition from the conductive connection illustrated in FIG. 3B to a nonconductive connection in response to a temperature of a battery cell.
Figure 4:
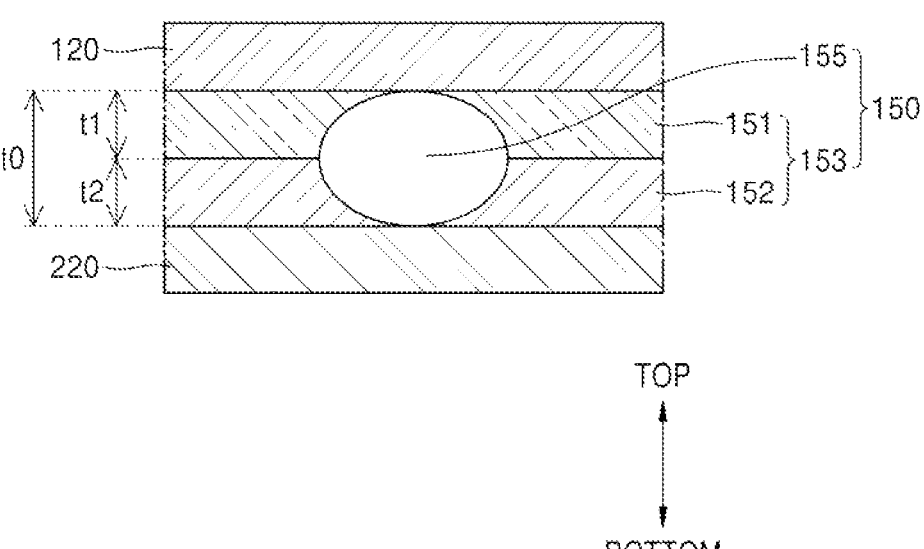
FIG. 4 is a cross-sectional view illustrating a structure of a thermocompression bonding layer applicable to a battery pack according to an embodiment.
Figure 5:
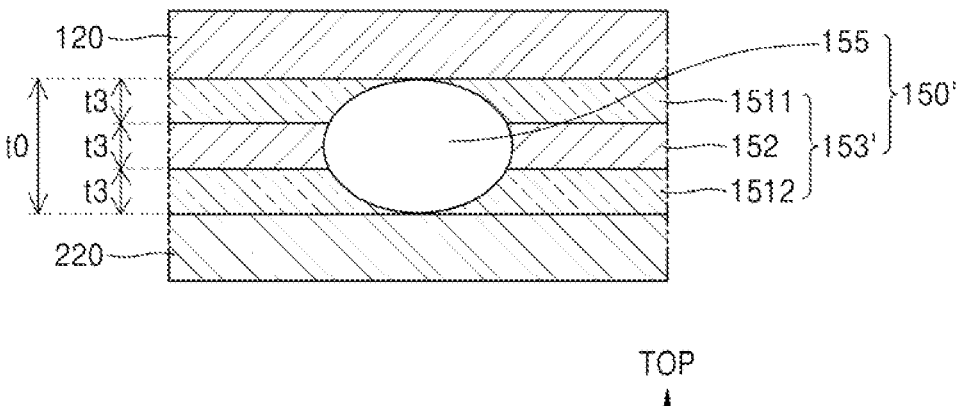
FIG. 5 is a cross-sectional view illustrating a structure of a thermocompression bonding layer applicable to a battery pack according to another embodiment.
Figure 6:
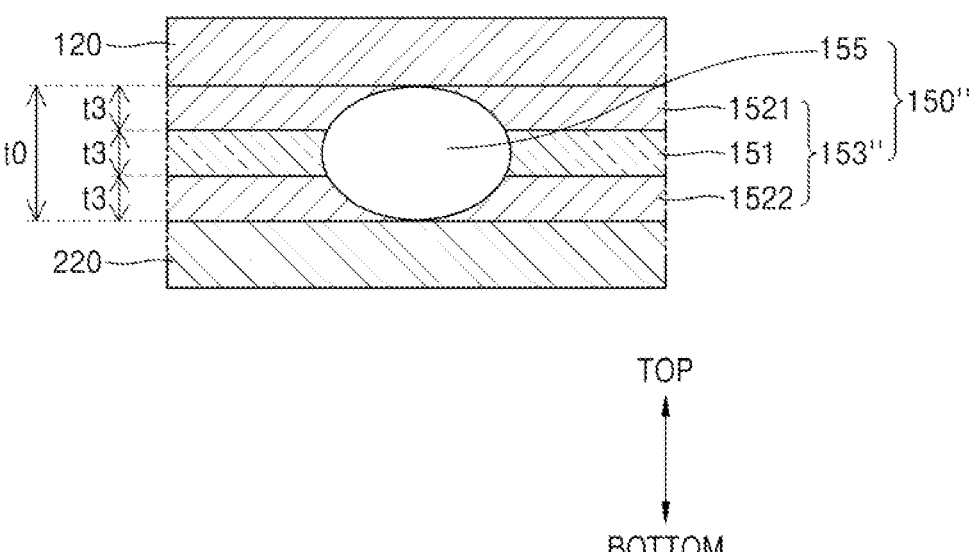
FIG. 6 is a cross-sectional view illustrating a structure of a thermocompression bonding layer applicable to a battery pack according to another embodiment.

FIG. 1 is an exploded perspective view of a battery pack according to an embodiment. FIG. 2 is an exploded perspective view of a battery cell illustrated in FIG. 1. FIG. 3A is a cross-sectional view of a stage in a high-temperature compression of a thermocompression bonding layer according to an embodiment (e.g., an initial stage in which an electrode tab 120 and a connection tab 220 are arranged on opposite sides of a thermocompression bonding layer 150). FIG. 3B is a cross-sectional view illustrating a conductive connection of the thermocompression bonding layer formed through the high-temperature compression illustrated in FIG. 3A (e.g., a completed stage, in which the electrode tab 120 and the connection tab 220 have been pressed together on opposite sides of the thermocompression bonding layer 150, and illustrates a stage of a normal electrical connection between the electrode tab 120 and the connection tab 220 through the thermocompression bonding layer 150 during normal operation of the battery pack). FIG. 3C is a cross-sectional view illustrating a stage in a transition from the conductive connection illustrated in FIG. 3B to a nonconductive connection in response to a temperature of a battery cell (e.g., a state in which an electrical connection between the electrode tab 120 and the connection tab 220 through the thermocompression bonding layer 150 is cut off, due to expansion of a first resin layer 151, in response to an abnormal occurrence of the battery pack, e.g., overheating). FIG. 4 is a cross-sectional view illustrating a structure of a thermocompression bonding layer applicable to a battery pack according to an embodiment. FIG. 5 is a cross-sectional view illustrating a structure of a thermocompression bonding layer applicable to a battery pack according to another embodiment. FIG. 6 is a cross-sectional view illustrating a structure of a thermocompression bonding layer applicable to a battery pack according to another embodiment.

Referring to the drawings, a battery pack according to an embodiment may include a battery cell 100, a protection circuit module 200 electrically connected to the battery cell 100, and a thermocompression bonding layer 150. In an implementation, the thermocompression bonding layer 150 may mediate or provide an (e.g., disconnectable) electrical connection between the battery cell 100 and the protection circuit module 200. In an implementation, the thermocompression bonding layer 150 may include conductive particles 155 and an insulating composite resin layer 153, which surrounds the conductive particles 155. In an implementation, the insulating composite resin layer 153 may include, e.g., a first resin layer 151 and a second resin layer 152. In an implementation, the first resin layer 151 may be different from the second resin layer 152 (e.g., may include different materials or otherwise have a different composition).

The protection circuit module 200 may form a high-current path, e.g., a charging/discharging current of the battery cell 100, or a low-current path related to state information of the battery cell 100. In an implementation, the protection circuit module 200 may obtain, as the state information of the battery cell 100, state information, such as a temperature, a voltage, or a current so as to control, based on the obtained state information, a switch element on or in a charging/discharging path to protect the battery cell 100 in response to an abnormal situation of the battery cell 100, and take appropriate protective measures in preparation for accidents, such as explosion or ignition of the battery cell 100, e.g., stop charging or discharging of the battery cell 100. In an implementation, the thermocompression bonding layer 150 may be between the battery cell 100 and the protection circuit module 200 to mediate the electrical connection therebetween, and may cut off the electrical connection between the battery cell 100 and the protection circuit module 200 in an abnormal situation, such as overheating, overcharging, or overdischarging of the battery cell 100 and may cut off charging and discharging of the battery cell 100 in response to an abnormal situation of the battery cell 100, and such a safety operation of the thermocompression bonding layer 150 may be performed in response to a temperature of the thermocompression bonding layer 150 regardless of control by the protection circuit module 200, rather than according to involvement of the protection circuit module 200, e.g., rather than according to control by the protection circuit module 200 on the switch element formed on the charging/discharging path, thus may be distinguished from protection measures by a switch element (e.g., a switch element mounted on the protection circuit module 200) made under control by the protection circuit module 200, and may be performed more quickly than, e.g., the protection measures by the switch element made under the involvement of the protection circuit module 200.

The battery cells 100 may be electrical connected with the protection circuit module 200 and may be arranged around the protection circuit module 200. In an implementation, the battery cells 100 arranged around the protection circuit module 200 may be arranged at adjacent positions such that electrode tabs 120 extend in parallel with each other. In an implementation, two or more battery cells 100 may be electrical connected with the protection circuit module 200 and may be arranged around the protection circuit module 200. In an implementation, two or more battery cells 100 may be arranged such that the electrode tabs 120 extend in parallel with each other, or such that the electrode tabs 120 face each other with the protection circuit module 200 therebetween. In an implementation, the battery cell 100 may include two or more battery cells 100, or may include only a single battery cell 100, and the technical configuration of the disclosure may be commonly applied to a battery pack including two or more battery cells 100 or a battery pack including only a single battery cell 100, and, e.g., as described below, the protection circuit module 200, which may be electrical connected to the battery cell 100 through the thermocompression bonding layer 150, may perform a safety operation in response to a temperature, may be applied between each of two or more battery cells 100 and the protection circuit module 200, may be applied between at least one of two or more battery cells 100 and the protection circuit module 200, or may be applied between a single battery cell 100 and the protection circuit module 200.

Referring to the drawings, the battery cell 100 may include an electrode assembly 110 and a casing P accommodating or sealing the electrode assembly 110 therein. The electrode assembly 110 may include first and second electrode plates 111 and 112 having opposite polarities, and a separator 113 between the first and second electrode plates 111 and 112, and may be formed in a winding type in which the first and second electrode plates 111 and 112 are wound in a roll shape with the separator 113 therebetween, or may be formed in a stack type in which a plurality of first and second electrode plates 111 and 112 are stacked with the separator 113 therebetween.

The electrode tab 120 may be connected to the electrode assembly 110. In an implementation, the electrode tab 120 may be electrically connected to the electrode assembly 110, may be withdrawn from the casing P surrounding the electrode assembly 110, and may be withdrawn from a terrace part T of the casing P. In an implementation, the electrode tab 120 may include first and second electrode tabs 121 and 122 having different polarities, and may be electrically connected to the first and second electrode plates 111 and 112, respectively. An insulating tape 130 may be attached to the electrode tab 120 to provide electrical insulation and sealing between the electrode tab 120 and the casing P.

The casing P may be a flexible casing, such as a pouch. The casing P may include an insulating layer on both surfaces of a metal layer of a thin plate, e.g., aluminum, and may be formed through a forming process, such as drawing.

The casing P may include first and second casings P1 and P2 coupled to each other to face each other with the electrode assembly 110 therebetween. The casing P may include a folding unit or folding section P3 that folds such that the first and second casings P1 and P2 overlap each other, and, by folding at the folding section P3 such that the first and second casings P1 and P2 face each other with respect to the folding section P3, the casing P accommodating the electrode assembly 110 may be formed. In an implementation, as the first and second casings P1 and P2 overlap each other to face each other with the electrode assembly 110 therebetween, an accommodation space A in which the electrode assembly 110 is accommodated and a sealing part TS for sealing the accommodation space A may be formed. The sealing part TS may be along the periphery of the accommodation space A to seal the accommodation space A in which the electrode assembly 110 is accommodated. In an implementation, the sealing part TS may be along edges of the casing P other than the edge of the casing P on which the folding section P3 is formed. In an implementation, the casing P having the first and second casings P1 and P2 are coupled to each other may form the appearance of a rectangular parallelepiped including a pair of short sides facing each other and a pair of long sides facing each other, and in this case, the sealing part TS may be continuously formed along the pair of long sides and the short side other than the short side on which the folding section P3 is formed.

The sealing part TS may include the terrace part T from which the electrode tab 120 electrically connected to the electrode assembly 110 is withdrawn, and a side sealing part S contacting the terrace part T and extending in a direction crossing the terrace part T. In an implementation, the terrace part T may be on one short side of the casing P, and the side sealing part S may be on the pair of long sides of the casing P. In an implementation, the terrace part T may extend in the direction crossing the electrode tab 120 to seal the accommodation space A, and the side sealing part S may extend along a direction crossing the terrace part T to seal the accommodation space A. The terrace part T and the side sealing part S may contact each other to form a continuous sealing part TS, and may seal the accommodation space A together. In an implementation, the battery cell 100 may include two or more battery cells 100 different from each other, e.g., the battery cells 100 arranged in parallel with each other such that the electrode tabs 120 connected to the protection circuit module 200 extend in parallel with each other. In an implementation, in a position of the protection circuit module 200 between the different battery cells 100 arranged in parallel with each other, an avoidance hole 200' for avoiding the sealing part TS of the different battery cells 100 may be formed. In an implementation, the avoidance hole 200' of the protection circuit module 200 may be a structure for avoiding physical interference between the sealing part TS of the battery cells 100 adjacent to each other and the protection circuit module 200 at a position where the adjacent battery cells 100 are in contact with each other, may be a structure for preventing the protection circuit module 200 from being lifted by the sealing part TS of the battery cell 100, and, e.g., may be formed on one side of the protection circuit module 200 to be opened toward the outside of the protection circuit module 200.

Regarding the arrangement of the battery cell 100, the battery cell 100 may be arranged such that the terrace part T from which the electrode tab 120 of the battery cell 100 is withdrawn faces the protection circuit module 200, and, through the electrode tab 120 of the battery cell 100 arranged to face the protection circuit module 200, an electrical connection with the protection circuit module 200 may be formed along a minimum path. A battery pack according to various embodiments may include two or more battery cells 100 or may include only a single battery cell 100. In an implementation, in the embodiment of the battery pack including a single battery cell 100, the protection circuit module 200 may be on the terrace part T, and, e.g., the protection circuit module 200 may be on the terrace part T of the battery cell 100 through an extra space facing the accommodation space A of the battery cell 100. The electrical connection between the battery cell 100 and the protection circuit module 200 may be formed as the electrode tab 120 of the battery cell 100 and a connection tab 220 of the protection circuit module 200 are arranged to overlap each other with the thermocompression bonding layer 150 therebetween. In an implementation, the thermocompression bonding layer 150 may connect the electrode tab 120 and the connection tab 220 to be electrically connected to each other, by applying high-temperature compression, e.g., hot press, between the electrode tab 120 and the connection tab 220 with the thermocompression bonding layer 150 therebetween.

Hereinafter, a conductive connection between the electrode tab 120 of the battery cell 100 and the connection tab 220 of the protection circuit module 200 will be described. For reference, throughout the present specification, that the electrode tab 120 of the battery cell 100 and the connection tab 220 of the protection circuit module 200 may form a conductive connection may mean that the thermocompression bonding layer 150 is between at least one electrode tab 120 of the first and second electrode tabs 120 of the battery cell 100 and the connection tab 220 of the protection circuit module 200, to form the electrical connection therebetween. In an implementation, all electrical connections between the first and second electrode tabs 121 and 122 and first and second connection tabs 221 and 222, respectively, may be collectively formed through the thermocompression bonding layer 150, and, e.g., by collectively applying a thermal compression process, such as hot press, between the battery cell 100 and the protection circuit module 200, it is possible to eliminate the complexity of a process and the inconvenience of process management that may occur in applying different processes between the different first and second electrode tabs 121 and 122 and first and second connection tabs 221 and 222 that form an electrical connection with the first and second electrode tabs 121 and 122, respectively.

In an implementation, the thermocompression bonding layer 150 may not be applied to all of the first and second electrode tabs 121 and 122 and the first and second connection tabs 221 and 222, and, e.g., may be selectively applied to any one of the first and second electrode tabs 121 and 122 and the first and second connection tabs 221 and 222. In an implementation, the thermocompression bonding layer 150 may be on or in a charging/discharging path of the battery cell 100 (e.g., may facilitate or provide an electrical connection between the battery cell 100 and the protection circuit module 200 during normal operation of the battery cell), and may respond to the temperature of the battery cell 100 and block the charging/discharging path of the battery cell 100 in an abnormal situation of the battery cell 100 in which the temperature of the battery cell 100 rises above a preset or predetermined threshold temperature. In an implementation, it may be sufficient that the thermocompression bonding layer 150 is applied to any one of electrical connections between the first and second electrode tabs 121 and 122 of the battery cell 100 and the first and second connection tabs 221 and 222 of the protection circuit module 200 forming the charging/discharging path of the battery cell 100, and the thermocompression bonding layer 150 may not be necessarily applied to both or all sides of the electrical connection between the first and second electrode tabs 121 and 122 of the battery cell 100 and the first and second connection tabs 221 and 222 of the protection circuit module 200.

The battery pack according to an embodiment may include the thermocompression bonding layer 150 that mediates a conductive connection between the electrode tab 120 of the battery cell 100 and the connection tab 220 of the protection circuit module 200. Through the present specification, the electrode tab 120 of the battery cell 100 and the connection tab 220 of the protection circuit module 200 may be counterparts to each other in an electrical connection therebetween through the thermocompression bonding layer 150, and may form, e.g., a charging/discharging path through which a charging/discharging current of the battery cell 100 may be communicated therebetween. In an implementation, the charging/discharging path may include the electrode tab 120 of the battery cell 100, the thermocompression bonding layer 150, and the connection tab 220 of the protection circuit module 200. In an implementation, an electrical path formed including the thermocompression bonding layer 150 may form a high-current path through which the charging/discharging current of the battery cell 100 is communicated, or may form a low-current path related to state information of the battery cell 100, e.g., state information, such as a temperature, a voltage, or a current of the battery cell 100. In an implementation, the thermocompression bonding layer 150 may perform, in an abnormal situation, a safety operation, as a safety element capable of blocking the charging/discharging path corresponding to the high-current path, and accordingly, may be applied to a high-current path through which the charging/discharging current of the battery cell 100 is communicated, rather than being applied to a low-current path through which the state information of the battery cell 100 is communicated. In an implementation, in order to apply a collective process, which is high-temperature compression of the thermocompression bonding layer 150, the thermocompression bonding layer 150 may be applied to both a high-current path, such as the charging/discharging current of the battery cell 100, and a low-current path, such as related to state information of the battery cell 100.

The thermocompression bonding layer 150 may include the conductive particles 155 and the insulating composite resin layer 153 surrounding the conductive particles 155. The conductive particles 155 may electrically connect between the electrode tab 120 of the battery cell 100 and the connection tab 220 of the protection circuit module 200, and, e.g., may be arranged in a single layer after being compressed (e.g., at a predetermined pressure) between the electrode tab 120 of the battery cell 100 and the connection tab 220 of the protection circuit module 200, to electrically connect between the electrode tab 120 and the connection tab 220.

The insulating composite resin layer 153 may serve as a vehicle for providing fluidity to the conductive particles 155, and as an adhesive agent for bonding and insulating the electrode tab 120 of the battery cell 100 and the connection tab 220 of the protection circuit module 200 to and from each other. In an implementation, the insulating composite resin layer 153 may be formed of a resin material that may change in fluidity according or in response to a change in temperature. In an implementation, in a high-temperature compression process, such as hot press, the insulating composite resin layer 153 may exhibit fluidity for the conductive particles 155 to be arranged between the electrode tab 120 and the connection tab 220 according to a certain pressure applied between the electrode tab 120 of the battery cell 100 and the connection tab 220 of the protection circuit module 200, and, when solidified at a relatively low temperature after a conductive connection between the electrode tab 120 and the connection tab 220 is formed, may help prevent the conductive particles 155 from being moved while surrounding the conductive particles 155 to firmly fix the position of the conductive particles 155. In an implementation, the electrical connection between the electrode tab 120 and the connection tab 220 may be formed or provided through the conductive particles 155 arranged in a single layer between the electrode tab 120 and the connection tab 220.

In an implementation, the insulating composite resin layer 153 may include heterogeneous resin layers, e.g., may include a first resin layer 151 and a second resin layer 152. In an implementation, the thermocompression bonding layer 150 may include heterogeneous resin materials having different behavioral characteristics or properties according to a temperature change. In an implementation, the insulating composite resin layer 153 may include, e.g., the first resin layer 151 (that exhibits a volume expansion in response to a temperature change), and the second resin layer 152 (that rarely, slightly, or negligibly exhibit a change in shape or volume in response to a temperature change).

In an implementation, the first resin layer 151 and the second resin layer 152 may have different behavioral characteristics or properties in response to a temperature change. In an implementation, that the first resin layer 151 may exhibit a volume expansion according to a temperature change, and the second resin layer 152 rarely exhibits a change in shape in response to a temperature change, which may mean that, regarding the degree of volume expansion in response to a temperature change, for example, the volume expansion rate according to a unit change in temperature, the volume expansion rate of the first resin layer 151 may be (e.g., significantly) greater than that of the second resin layer 152. Throughout the present specification, that the second resin layer 152 negligibly exhibits a change in shape or volume in response to a temperature change may mean that the second resin layer 152 has excellent shape stability at high temperature, and may mean that the shape stability of the second resin layer 152 at high temperature is greater than that of the first resin layer 151. In an implementation, the first resin layer 151 may lose shape stability and have fluidity when reheated to a high temperature even after previously being heated to a high temperature and then cooled to a low temperature (setting temperature) to be molded into a particular shape. In an implementation, the second resin layer 152 may maintain shape stability and may not have fluidity even when reheated to a high temperature after being molded into a particular shape at a high temperature (setting temperature). In an implementation, the first resin layer 151 may include a thermoplastic resin material, e.g., an acrylic material. In an implementation, the second resin layer 152 may include a thermosetting resin-based material, e.g., an epoxy material.

In an implementation, the first resin layer 151 and the second resin layer 152 may be formed of different types of resin materials that exhibit different thermal behaviors. In an implementation, the first resin layer 151 and the second resin layer 152 may be formed of various types of heterogeneous (e.g., different) resin materials such that the conductive connection between the electrode tab 120 of the battery cell 100 and the connection tab 220 of the protection circuit module 200 may transition, at a transition temperature of, e.g., approximately 70° C. to 90° C., to a nonconductive connection in which the electrical connection between the electrode tab 120 and the connection tab 220 is cut off, and the conductive particles 155 may be prevented from leaking out, even at such a transition temperature.

In an implementation, the thermocompression bonding layer 150 that includes the insulating composite resin layer 153 including the first resin layer 151 and the second resin layer 152 (having different thermal behaviors) may perform the safety operation, as a safety element of the battery cell 100. Hereinafter, the safety operation of the thermocompression bonding layer 150 will be described.

In an implementation, the thermocompression bonding layer 150 may block the charging/discharging path of the battery cell 100 in abnormal situations, e.g., overheating, overcharging, or overdischarging of the battery cell 100, may protect the battery cell 100 by stopping a charging/discharging operation of the battery cell 100 in an abnormal situation, and may prevent an accident due to explosion or ignition of the battery cell 100. In an implementation, in an abnormal situation, e.g., overheating, overcharging, or overdischarging of the battery cell 100, the battery cell 100 may be overheated to a predetermined threshold temperature or higher, and the thermocompression bonding layer 150 may block the charging/discharging path of the battery cell 100 (e.g., by detecting abnormal overheating of the battery cell 100 corresponding to the threshold temperature or higher).

In an implementation, if the battery cell 100 were to be abnormally overheated, the conductive connection of the thermocompression bonding layer 150 that mediates or facilitates the electrical connection between the electrode tab 120 of the battery cell 100 and the connection tab 220 of the protection circuit module 200 may transition to a nonconductive connection, e.g., in which the electrical connection between the electrode tab 120 and the connection tab 220 is cut off. In an implementation, the nonconductive connection means that, even when the electrical connection between the electrode tab 120 and the connection tab 220 is cut off, the physical restraint or connection between the electrode tab 120 and the connection tab 220 may be maintained. A temperature at which the conductive connection of the thermocompression bonding layer 150 transitions to the nonconductive connection, e.g., a transition temperature, may correspond to a temperature at which the safety operation of the battery cell 100 starts, may correspond to a predetermined threshold temperature, and, e.g., may correspond to a temperature of about 90° C. In an implementation, the thermocompression bonding layer 150 may be a temperature sensitive element, and may cut off the conductive connection at the predetermined threshold temperature or the transition temperature or higher.

The thermocompression bonding layer 150 may include the first resin layer 151 that exhibits a volume expansion behavior in response to a temperature change, and, as the volume of the first resin layer 151 expands at a temperature greater than or equal to the transition temperature, e.g., as a thickness of the first resin layer 151 increases, a distance between the electrode tab 120 of the battery cell 100 and the connection tab 220 of the protection circuit module 200 (that were electrically connected with each other through the conductive particles 155) may be increased such that the electrode tab 120 or the connection tab 220 is spaced apart from the conductive particles 155, and thus, the conductive or electrical connection between the electrode tab 120 and the connection tab 220 may be cut off. In an implementation, the thermocompression bonding layer 150 may include the first resin layer 151 that exhibits a behavior of volume expansion according to a temperature change, and the second resin layer 152 that maintains shape stability despite a temperature change, and the second resin layer 152 may negligibly exhibit a shape change, may maintain a stable shape, may maintain the position of the conductive particles 155, and may help prevent the conductive particles 155 from leaking out, even at a temperature greater than or equal to the transition temperature (e.g., at which the conductive connection of the thermocompression bonding layer 150 transitions to the nonconductive connection). If the conductive particles 155 were unable to maintain their position between the electrode tab 120 of the battery cell 100 and the connection tab 220 of the protection circuit module 200 at a temperature greater than or equal to the transition temperature (or a preset threshold temperature) corresponding to an abnormal situation of the battery cell 100, and were to move or leak out from between the electrode tab 120 and the connection tab 220, the conductive particles 155 leaked out from between the electrode tab 120 and the connection tab 220 in the abnormal situation of the battery cell 100, such as overheating or overcurrent, causes an unintentional short circuit, could may lead to a serious accident. In an implementation, the thermocompression bonding layer 150 may include the first resin layer 151 for transitioning the conductive connection of the thermocompression bonding layer 150 to the nonconductive connection in response to an abnormal situation of the battery cell 100, and the second resin layer 152 that may maintain shape stability despite a temperature change, and it is possible to cut off the conductive connection by the conductive particles 155, and prevent an unintentional short circuit caused by the conductive particles 155 leaking out.

In an implementation, the thermocompression bonding layer 150 may include the first resin layer 151 capable of cutting off the conductive connection by the conductive particles 155 through volume expansion at a temperature greater than or equal to the transition temperature, and the second resin layer 152 capable of maintaining shape stability even at a temperature greater than or equal to the transition temperature so as to prevent the conductive particles 155 from being leaking out.

In an implementation, the thermocompression bonding layer 150 may include the first resin layer 151 and the second resin layer 152 having different thermal behaviors or exhibiting different thermal properties, may not mean that the first resin layer 151 and the second resin layer 152 are mixed with each other to such an extent that the interface at which they contact each other cannot be distinguished and thus form one layer, but may that they exist in different layers separated from each other with an interface at which they contact each other. In an implementation, the thermocompression bonding layer 150 may include the first resin layer 151 and the second resin layer 152 stacked with respect to each other, and the first resin layer 151 and the second resin layer 152 may be different layers with an interface therebetween at which they contact each other.

In an implementation, the thermocompression bonding layer 150 may include the first resin layer 151 and the second resin layer 152 having different thermal behaviors, may cut off the conductive connection by the conductive particles 155 at a temperature greater than or equal to the transition temperature, and may help prevent the conductive particles 155 from being leaking out, through the high-temperature shape stability of the second resin layer 152.

In another aspect of the disclosure, the thermocompression bonding layer 150 may include the first resin layer 151 capable of implementing a safety operation through volume expansion in response to an abnormal situation of the battery cell 100, and the second resin layer 152 having relatively excellent fluidity and adhesive characteristics, a flow of the conductive particles 155 toward the electrode tab 120 of the battery cell 100 and the connection tab 220 of the protection circuit module 200 may easily formed through the fluidity of the second resin layer 152, and robust adhesion between the electrode tab 120 of the battery cell 100 and the connection tab 220 of the protection circuit module 200 may be implemented through the adhesive characteristics of the second resin layer 152. In an implementation, the first resin layer 151 may implement or facilitate the safety operation of the thermocompression bonding layer 150, and the second resin layer 152 may complement the characteristics of the first resin layer 151 to help improve the flow of conductive particles 155 toward between the electrode tab 120 of the battery cell 100 and the connection tab 220 of the protection circuit module 200, and may implement or facilitate robust or strong adhesion between the electrode tab 120 of the battery cell 100 and the connection tab 220 of the protection circuit module 200.

In an implementation, the fluidity of the second resin layer 152 may be relatively superior to that of the first resin layer 151, e.g., the fluidity of the second resin layer 152, before the shape of the second resin layer 152 is fixed to have a particular shape at a high setting temperature, may be relatively excellent, and the second resin layer 152, once fixed to have the particular shape at the high setting temperature, may generally maintain the shape even when reheated (e.g., may exhibit high-temperature shape stability). In an implementation, the second resin layer 152 may be fixed to have the shape at the high setting temperature, and may have less fluidity or flexibility than that of the first resin layer 151 having a behavior of volume expansion through reheating.

In an implementation, the first resin layer 151 and the second resin layer 152 may be between the electrode tab 120 of the battery cell 100 and the connection tab 220 of the protection circuit module 200, e.g., the first resin layer 151 and the second resin layer 152 may be stacked with respect to each other. In an implementation, the arrangement order of the first resin layer 151 and the second resin layer 152 may be varied. In an implementation, the first resin layer 151 and the second resin layer 152 may be stacked with respect to each other between the electrode tab 120 and the connection tab 220, e.g. the first resin layer 151 may be closer to the electrode tab 120 than the connection tab 220 and the second resin layer 152 may be closer to the connection tab 220 than the electrode tab 120, or the first resin layer 151 may be closer to the connection tab 220 than the electrode tab 120 and the second resin layer 152 may be closer to the electrode tab 120 than the connection tab 220.

In an implementation, as illustrated in FIG. 4, the first resin layer 151 and the second resin layer 152 may have thicknesses $t1$ and $t2$, respectively, to cover a total thickness $t0$ of the conductive particles 155, e.g., a sum of the thicknesses $t1$ and $t2$ may be equal to the thickness $t0$ of the conductive particles 155 (e.g., after compression molding and during a normal operation of the battery pack). In an implementation, the sum of the first thickness $t1$ of the first resin layer 151 and the second thickness $t2$ of the second resin layer 152 may be equivalent or about equal to the thickness $t0$ of the conductive particles 155 between the electrode tab 120 and the connection tab 220, e.g., may cover the thickness $t0$ of the conductive particles 155 to fix the position of the conductive particles 155 and prevent the conductive particles 155 from being spaced apart from the electrode tab 120 and the connection tab 220 such that the electrode tab 120 and the connection tab 220 may be electrically connected to each other through the conductive particles 155 (e.g., during normal operation of the battery pack). In an implementation, the sum of the first thickness $t1$ of the first resin layer 151 and the second thickness $t2$ of the second resin layer 152 may be equivalent to the thickness $t0$ of the entire conductive particles 155, e.g., each of the first thickness $t1$ of the first resin layer 151 and the second thickness $t2$ of the second resin layer 152 may be less than the thickness $t0$ of the conductive particles 155. In an implementation, the first thickness $t1$ of the first resin layer 151 and the second thickness $t2$ of the second resin layer 152 may be substantially equal to each other, and each of the first and second thicknesses $t1$ and $t2$ may be about half the thickness $t0$ of the conductive particles 155 such that the first and second thicknesses $t1$ and $t2$, which are equivalent to each other, may cover the thickness $t0$ of the entire conductive particles 155.

In an implementation, the first resin layer 151 and the second resin layer 152 may be components for ensuring that the safety operation of the thermocompression bonding layer 150 is performed without omission through their different thermal behaviors during the safety operation of the thermocompression bonding layer 150 and to help prevent other side effects, e.g., a short circuit. In an implementation, the first resin layer 151 may implement or facilitate the safety operation of the thermocompression bonding layer 150, the second resin layer 152 may help fix the position of the conductive particles 155 during the safety operation of the thermocompression bonding layer 150. In an implementation, the thicknesses $t1$ and $t2$ of the first resin layer 151 and the second resin layer 152 may be equivalent to each other, in order to keep the balance between the first resin layer 151 and the second resin layer 152 that form the thermocompression bonding layer 150. In an implementation, a ratio of the content degree or thickness of the first resin layer 151 to the content degree or thickness of the second resin layer 152 may be about 1:1 (e.g., during normal operation of the battery pack). In an implementation, the first resin layer 151 and the second resin layer 152 may have different content degrees, e.g., the content degrees of the first resin layer 151 and the second resin layer 152 that form the thermocompression bonding layer 150 may be different from each other, as illustrated in FIGS. 5 and 6. In an implementation, the content degrees (e.g., number or amount of the first resin layer 151 and the second resin layer 152 relative to one another) may be in a ratio of 2:1 or 1:2, rather than 1:1, e.g., according to the desired characteristics of a battery pack to which the thermocompression bonding layer 150. In an implementation, in a case in which the first thickness $t1$ of the first resin layer 151 is greater than the second thickness $t2$ of the second resin layer 152 in order to ensure the safety operation of the thermocompression bonding layer 150, or in a case in which the thickness $t2$ of the second resin layer 152 is greater than the thickness $t1$ of the first resin layer 151 in order to minimize side effects, such as an unintentional short circuit during the safety operation of the thermocompression bonding layer 150.

FIGS. 5 and 6 are cross-sectional views illustrating structures of thermocompression bonding layers 150' and 150" that may be implemented in other embodiments.

The thermocompression bonding layer 150', or an insulating composite resin layer 153' of the thermocompression bonding layer 150' illustrated in FIG. 5, may be formed such that one second resin layer 152 is between different or separate first resin layers 1511 and 1512, e.g., may include a lower first resin layer 1512, the second resin layer 152, and an upper first resin layer 1511, and may form a three-layer structure. In an implementation, the thermocompression bonding layer 150' may include the first resin layer 151 and the second resin layer 152, which have different material characteristics, and thus forms a three-layer structure may mean that, e.g., the first resin layers 1511 and 1512 and the second resin layer 152 may be stacked to form a three-layer structure with an interface that may separate therebetween.

In an implementation, as illustrated in FIG. 5, the first resin layers 1511 and 1512 may be two, e.g., separate, layers, and the second resin layer 152 may be one, e.g., single, layer. In an implementation, thicknesses $t3$ of the each of layers 1511, 152, and 1512 may be equivalent to each other, and accordingly, the first resin layers 1511 and 1512 and the second resin layer 152 that form the thermocompression bonding layer 150' may be have different content degrees. In an implementation, the thicknesses of the first resin layers 1511 and 1512 or the content degrees of the first resin layers 1511 and 1512, and the thickness of the second resin layer 152 or the content degree of the second resin layer 152 may be in a ratio of 2:1.

In an implementation, as illustrated in FIG. 5, by forming the first resin layers 1511 and 1512 at a position where the electrode tab 120 and the connection tab 220 and the conductive particles 155 contact each other (e.g., at outer top and bottom sides of the thermocompression bonding layer 150'), the electrode tab 120 and the conductive particles 155 and the connection tab 220 and the conductive particles 155 may be effectively spaced apart from each other due to volume expansion of the first resin layers 1511 and 1512 at a temperature greater than a transition temperature at which a conductive connection of the thermocompression bonding layer 150' transitions to a nonconductive connection, thus the conductive connection between the electrode tab 120 and the connection tab 220 may be reliably cut off, and the safety operation of the thermocompression bonding layer 150 may be reliably implemented.

In an implementation, the volume expansion of the first resin layers 1511 and 1512 may include thickness expansion of the first resin layers 1511 and 1512, and the conductive particles 155 pressed between the electrode tab 120 and the connection tab 220 may then be spaced apart from the electrode tab 120 and/or the connection tab 220 due to the thickness expansion of the first resin layers 1511 and 1512. Accordingly, the conductive connection between the electrode tab 120 and the connection tab 220 via the conductive particles 155 may be cut off.

FIG. 6 is a cross-sectional view illustrating a thermocompression bonding layer 150" that may be implemented in another embodiment.

The thermocompression bonding layer 150", or an insulating composite resin layer 153" of the thermocompression bonding layer 150''' illustrated in FIG. 6, may be formed such that one first resin layer 151 is between different or separate second resin layers 1521 and 1522. In an implementation, the thermocompression bonding layer 150" may include a lower second resin layer 1522, the first resin layer 151, and an upper second resin layer 1511, and thus may form a three-layer structure. In an implementation, the thermocompression bonding layer 150" may include the first resin layer 151 and the second resin layers 1521 and 1522, which have different material characteristics, and thus may form a three-layer structure, e.g., the first resin layer 151 and the second resin layers 1521 and 1522 may be stacked to form a three-layer structure with an interface that may separate therebetween.

In an implementation, as illustrated in FIG. 6, the first resin layer 151 may be one layer and the second resin layers 1521 and 1522 may be two layers. In an implementation, the thicknesses t3 of each of the layers 1521, 151, and 1522 may be equivalent to each other, and accordingly, the first resin layer 151 and the second resin layers 1521 and 1522 that form the thermocompression bonding layer 150" may be formed to have different content degrees, and, e.g., the thickness of the first resin layer 151 or the content degree of the first resin layer 151, and the thicknesses of the second resin layers 1521 and 1522 or the content degrees of the second resin layers 1521 and 1522 may be in a ratio of 1:2. In an implementation, as illustrated in FIG. 6, the second resin layers 1521 and 1522, at upper and lower positions of the conductive particles 155, may be capable of fixing the position of the conductive particles 155 as two layers, and it is possible to effectively prevent the conductive particles 155 from leaking out during the safety operation of the thermocompression bonding layer 150", thus suppressing the occurrence of an unintentional short circuit due to the conductive particles 155 leaking out, and prevent further damage due to an unintentional short circuit in an abnormal situation of the battery cell 100.

According to the disclosure, by forming an electrical connection between a battery cell and a protection circuit module and providing a thermocompression bonding layer capable of performing a safety operation in response to a temperature of the battery cell, the safety operation may be implemented simultaneously with the electrical connection between the battery cell and the protection circuit module, and thus, a battery pack in which the overall structure may be simplified because there is no need to provide a separate safety element, may be provided.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
at least one battery cell;
a protection circuit module electrically connected to the at least one battery cell; and
a thermocompression bonding layer, the thermocompression bonding layer providing a disconnectable electrical connection between an electrode tab of the at least one battery cell and a connection tab of the protection circuit module,
wherein:
the thermocompression bonding layer includes conductive particles and an insulating composite resin layer,
the insulating composite resin layer surrounds the conductive particles,
the insulating composite resin layer includes at least one first resin layer and at least one second resin layer, the at least one first resin layer being different from the at least one second resin layer and
the insulating composite resin layer is between the electrode tab of the at least one battery cell and the connection tab of the protection circuit module.

2. The battery pack as claimed in claim 1, wherein
the at least one first resin layer includes a thermoplastic resin material that undergoes a volume expansion at a temperature greater than or equal to a predetermined transition temperature, and
the at least one second resin layer includes a thermosetting resin material that maintains shape stability at a temperature greater than or equal to the predetermined transition temperature.

3. The battery pack as claimed in claim 2, wherein the predetermined transition temperature is a predetermined threshold temperature for detecting an abnormal situation of the at least one battery cell.

4. The battery pack as claimed in claim 1, wherein the at least one first resin layer and the at least one second resin layer are stacked with respect to each other between the electrode tab of the at least one battery cell and the connection tab of the protection circuit module.

5. The battery pack as claimed in claim 4, wherein the at least one first resin layer and the at least one second resin layer are different layers separated from each other with an interface therebetween.

6. The battery pack as claimed in claim 1, wherein the insulating composite resin layer is between the electrode tab of the at least one battery cell and the connection tab of the protection circuit module in a two-layer structure including the at least one first resin layer and the at least one second resin layer stacked with respect to each other.

7. The battery pack as claimed in claim 6, wherein a thickness of the at least one first resin layer is about equal to a thickness of the at least one second resin layer.

8. The battery pack as claimed in claim 1, wherein:
the at least one first resin layer includes two separate first resin layers, and
the insulating composite resin layer is between the electrode tab of the at least one battery cell and the connection tab of the protection circuit module in a three-layer structure in which the at least one second resin layer is between the separate first resin layers.

9. The battery pack as claimed in claim 8, wherein the two separate first resin layers are adjacent to:
a position at which the electrode tab and the conductive particles contact each other, and
a position at which the connection tab and the conductive particles contact each other.

10. The battery pack as claimed in claim 8, wherein:
the two separate first resin layers include an upper first resin layer and a lower first resin layer,
the at least one second resin layer is between the upper first resin layer and the lower first resin layer,
a thickness of the upper first resin layer is about the same as a thickness of the at least one second resin layer, and the thickness of the upper first resin layer is about the same as a thickness of the lower first resin layer.

11. The battery pack as claimed in claim 1, wherein:

the at least one second resin layer includes two separate second resin layers, and the insulating composite resin layer is between the electrode tab of the at least one battery cell and the connection tab of the protection circuit module in a three-layer structure in which the at least one first resin layer is between the separate second resin layers.

12. The battery pack as claimed in claim 11, wherein:

the two separate second resin layers include an upper second resin layer and a lower second resin layer, the at least one first resin layer is between the upper second resin layer and the lower second resin layer, a thickness of the upper second resin layer is about the same as a thickness of the at least one first resin layer, and the thickness of the upper second resin layer is about the same as a thickness of the lower second resin layer.

13. The battery pack as claimed in claim 1, wherein the thermocompression bonding layer provides a high-current path for a charging/discharging current of the at least one battery cell.

14. The battery pack as claimed in claim 1, wherein the at least one battery cell includes a plurality of different battery cells that are electrically connected with the protection circuit module.

15. The battery pack as claimed in claim 14, wherein the plurality of different battery cells are adjacent to each other such that electrode tabs connected to the protection circuit module extend in parallel with each other.

16. The battery pack as claimed in claim 15, wherein the protection circuit module includes an avoidance hole at a position between the plurality of different battery cells adjacent to each other, the avoidance hole accommodating sealing parts of the different battery cells.

17. The battery pack as claimed in claim 1, wherein:

the at least one battery cell includes a first electrode tab and a second electrode tab having different polarities, the protection circuit module includes a first connection tab connected to the first electrode tab and a second connection tab connected to the second electrode tab, respectively, and the thermocompression bonding layer is between the first electrode tab and the first connection tab and between the second electrode tab and the second connection tab.

* * * * *